O. WALTER.
VULCANIZING DISTINCT PARTS OR SURFACES OF RUBBER.
APPLICATION FILED MAR. 14, 1911.
1,052,430.
Patented Feb. 4, 1913.
2 SHEETS—SHEET 1.
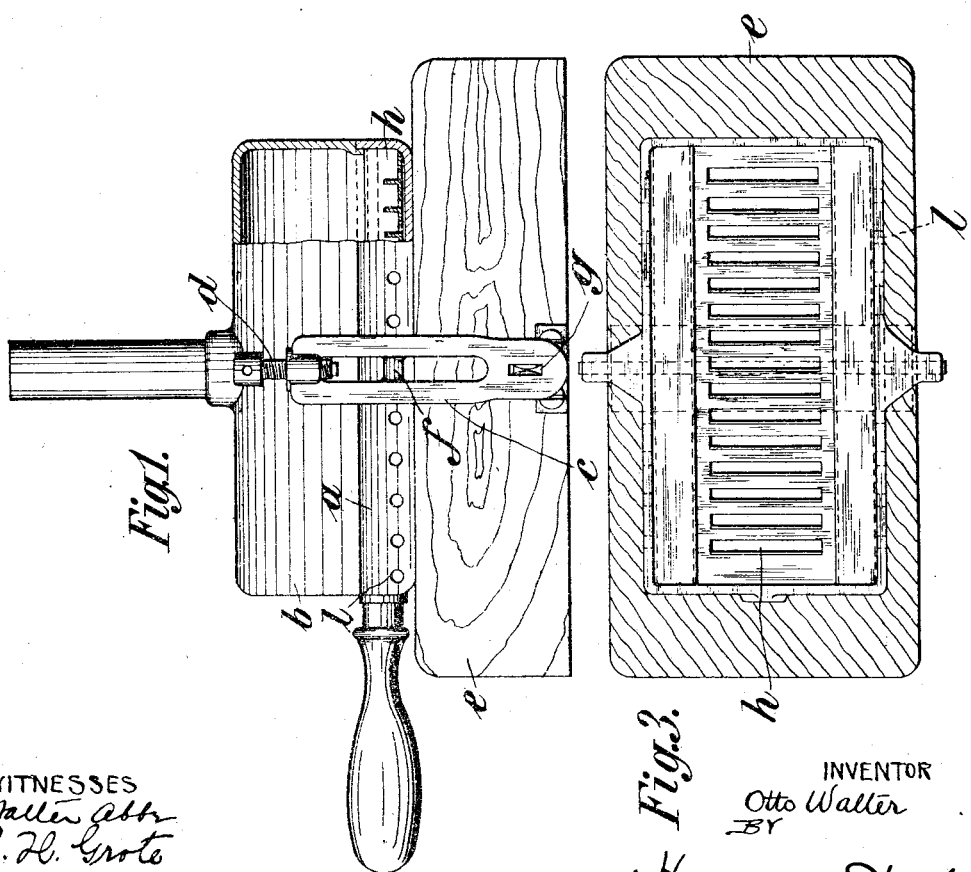
INVENTOR
Otto Walter O. WALTER.
VULCANIZING DISTINCT PARTS OR SURFACES OF RUBBER.
APPLICATION FILED MAR. 14, 1911.
1,052,430.
Patented Feb. 4, 1913.
2 SHEETS—SHEET 2.
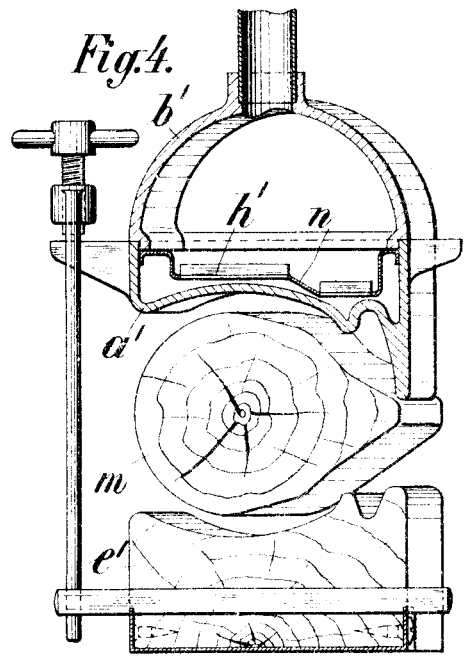
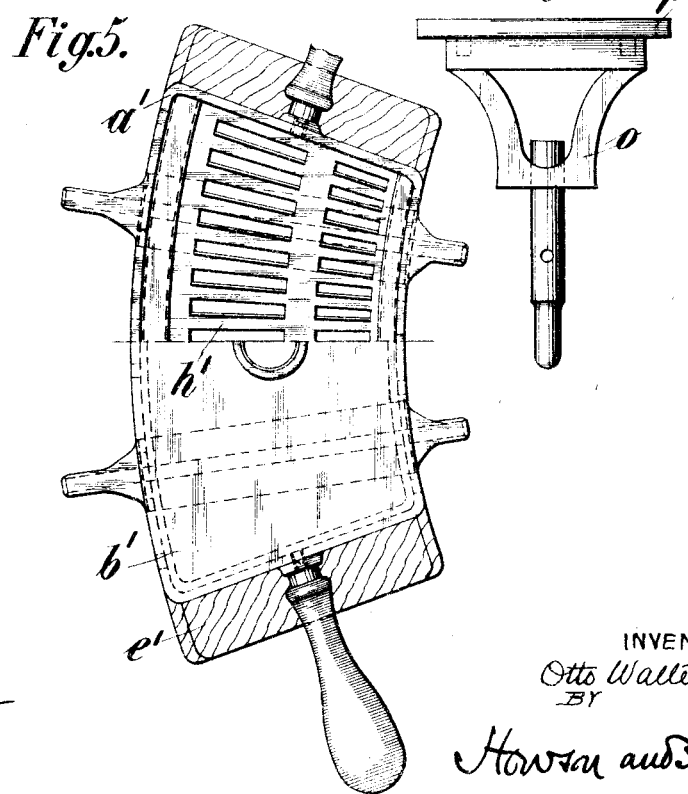

UNITED STATES PATENT OFFICE.

OTTO WALTER, OF HANOVER, GERMANY.

VULCANIZING DISTINCT PARTS OR SURFACES OF RUBBER.

1,052,430.     Specification of Letters Patent.     Patented Feb. 4, 1913.

Application filed March 14, 1911. Serial No. 614,328.

*To all whom it may concern:*

Be it known that I, OTTO WALTER, a subject of the King of Prussia, and residing at Hanover, Germany, have invented certain new and useful Improvements in and Relating to Vulcanizing Distinct Parts or Surfaces of Rubber, of which the following is a specification.

In the mending of damaged rubber tires, tubes and the like, vulcanizing devices have hitherto been employed in which the mold plate which is adjusted to the body treated, is heated in its entirety by a source of heat, which is arranged at the bottom of the vulcanizing device. This procedure however is attended by the disadvantage that inasmuch as the entire mold plate of the vulcanizer is heated, portions of the body which are not to be vulcanized are heated and consequently are unfavorably affected by the resulting softening.

To obviate this difficulty according to the present invention the metallic mold is heated only at the particular spot which overlies the portion of the object which it is desired to vulcanize and this is accomplished for example by placing in the mold at the predetermined vulcanization spot a greater or less quantity of the preheated live coals which serve to produce the vulcanization. Beneath the coals supporting pins or a grate may be arranged in the vulcanizer, while according to the form of the body heated or the vulcanization spot may be specially shaped. Instead of live coals, many other suitable sources of heat may be substituted to secure the localized heat—for example a gas heated body the form of which corresponds to the surface to be vulcanized. An electrically heated body having a separated arrangement of the heating source may also be employed.

In the accompanying drawings, Figure 1 is a side elevation partially in section of a device for vulcanizing tubes; Fig. 2 is a vertical cross section of the same; Fig. 3 is a plan view of the same; Fig. 4 is a vertical section of a vulcanizer for repairing tires; Fig. 5 is a plan thereof, partially in section; and Fig. 6 is a side elevation of a modification.

Referring to Figs. 1 to 3 the invention is here illustrated in a mold comprising a mold-chamber $a$ with cover $b$, clamped to the base $e$ of wood or other suitable material by slotted links $c$ carrying screws $d$ which bear upon the lugs $f$ projecting through the slots in the links. The latter are rigidly connected to the base by the transverse pin $g$. Within the mold chamber $a$ is arranged an angular grate $h$ on which is placed at the predetermined spot the heat generating live coal $i$ which produce the vulcanization at the desired place. The heated air escapes through the pipe $k$, while fresh cool air enters the chambers through said holes $l$ and serves to prevent overheating. The rubber body that is being treated is clamped in the usual way between the base $e$ and the bottom of the mold and is thus heated by the coal $i$ only at the point at which it is desired to effect vulcanization.

The apparatus shown in Figs. 4 and 5 in like manner show a mold-box $a^1$, a cover $b^1$ and a base $e^1$, the adjacent faces of the mold box and base being shaped to receive a beaded tire of common form, and being curved longitudinally to conform substantially to the curvature thereof. A mandrel $m$ may be arranged between the mold box and base, which will serve to support the tire and prevent its collapse when the mold plate is pressed down. The grate $h^1$ or other supporting means, on which the coals are placed is offset at $n$ in order to keep the coals as thick as possible at the spot to be vulcanized and thus accelerate the vulcanization process.

The invention can of course be applied to the vulcanization of various rubber bodies, in which case as in the embodiments described, the mold box and base have their juxtaposed faces shaped to the object heated, and the grate within the mold box adapted to the shape thereof for the purpose specified.

In Fig. 6 a burner $o$ is shown for heating the mold by gas instead of by charcoal. In this arrangement the face plate $p$ is preferably removable so that plates of various shapes may be employed which are suitably shaped to the object to be heated. Electricity may also be employed as above mentioned to heat the mold.

By the use of the vulcanizing method above explained, that is, through the use of a source of heat (for example live coals) which possesses and is adapted to maintain a temperature sufficiently high to completely vulcanize the rubber, a distinct advantage is obtained since the process may be successfully completed without using any testing appliance whatever.

The vulcanization process is not only simple and expeditious but after the body to be heated has been once placed in position in the mold no further oversight or regulation is necessary to insure complete vulcanization.

I claim as my invention—

1. The method of repairing by vulcanization injuries to rubber articles, particularly automobile tires, which consists in applying a portable mold with heat-conducting face of greater area than the spot to be repaired, directly to the rubber body under treatment, and applying heat locally to only that portion of said heat-conducting surface which it is desired to heat to vulcanizing temperature.

2. The method of repairing by vulcanization injuries to rubber articles, particularly automobile tires, which consists in applying a portable mold with heat-conducting face of greater area than the spot to be repaired, directly to the rubber body under treatment, and placing live coals locally over only that portion of said heat-conducting surface which it is desired to heat to vulcanizing temperature.

3. The method of repairing by vulcanization injuries to rubber articles, particularly automobile tires, which consists in applying a portable mold with heat-conducting face of greater area than the spot to be repaired, directly to the rubber body under treatment, and placing live coals locally over only that portion of said heat-conducting surface which it is desired to heat to vulcanizing temperature, said coals having been brought to such temperature before placing in the mold that vulcanization is completely effected thereby without further attention or oversight.

4. The method of repairing by vulcanization injuries to rubber articles, particularly automobile tires, which consists in applying a portable hollow mold with heat conducting face of greater area than the spot to be repaired directly to the rubber body under treatment and placing within the mold a plurality of small heating units (such as live coals) locally over only that portion of said heat-conducting surface which it is desired to bring to vulcanizing temperature, the temperature of said heating units being such as to completely effect vulcanization without further attention or oversight, substantially as described.

In testimony whereof I have signed my name to this specification, in the presence of two subscribing witnesses.

OTTO WALTER.

Witnesses:
OTTO FHLAN,
R. W. MAHONEY.